INVENTORS:
CHIANG-HAI KUO
PIETER VAN MEURS

THEIR ATTORNEY

United States Patent Office

3,559,476
Patented Feb. 2, 1971

3,559,476
METHOD FOR TESTING A WELL
Chiang-hai Kuo and Peter Vanmeurs, Houston, Tex., assignors to Shell Oil Company, New York, N.Y., a corporation of Delaware
Filed Apr. 28, 1969, Ser. No. 819,879
Int. Cl. E21b *49/00*
U.S. Cl. 73—155                                                 7 Claims

ABSTRACT OF THE DISCLOSURE

A method for measuring a reservoir property of a porous earth formation adjacent to a well by establishing a pulsating flow of fluid through the well into and out of the earth formation at rates that vary with time in accordance with a predetermined periodic function. The variations with time of the pressure in the well is measured and the phase shift and amplitude of the pressure variations with time relative to the variations with time of the rates of the pulsating flow of fluid is determined.

BACKGROUND OF THE INVENTION

Field of the invention

This invention relates to the testing of a well to determine a reservoir property near the well.

Description of the prior art

In order to obtain maximum usefulness of new reservoir analysis methods and to aid in the understanding of local reservoir irregularities, improved methods are required to delineate heterogeneities in porous earth formations adjacent to wells. Many factors, such as well spacing and well completion, depend on the extent and location of these heterogeneities that affect flow behavior.

One prior art method of obtaining a measure of the heterogeneity of a porous earth formation is an interference test. In an interference test, constant-rate production or injection is initiated at a first well and the effect of this flow is measured versus time at a second well. Thus, during such interference tests the flow characteristics of the porous earth formation are determined in situ.

Although such tests are obviously useful in studying reservoirs, interference tests have not enjoyed frequent usage. Reasons for this have been the relatively long time required in many fields to obtain a pressure response which is measurable with conventional gauges, and the interruption of routine field operation during the field-wide shut-in normally required during these periods. Also, only average properties of the relatively large volume of the porous earth formation disturbed during these periods can normally be obtained. It is impossible to determine variations in properties between individual wells.

In order to eliminate drawbacks of conventional tests, a special technique has been developed for evaluating porous earth formation properties between wells. This technique is called pulse-testing and utilizes a sensitive differential-pressure gauge at a responding well to measure and record the response generated by a series of flow rate changes (pulses) at an adjacent or pulsating well. Since pulse-test instruments have a sensitivity of about 0.001 p.s.i., pulses of several hours or less in duration will generate a measurable response in most reservoirs. Thus, many well pairs can be tested in a short period of time with little interference in field operations.

In comparing pulse-testing results with conventional testing methods, the pulses obey unsteady-state, compressible-flow theory and thus provide a measure of both transmissibility ($kh/\mu$) and storage ($\phi ch$). In addition, the pulse-testing method can be used qualitatively to describe communication across faults and between zones, and direction and magnitude of fracture trends. A more complete discussion of the pulse-testing theory appears in an article by Johnson, C. R., Greenkorn, R. A. and Woods, E. G. (1966), "Pulse-Testing: A New Method for Describing Reservoir Flow Properties Between Wells," J. of Pet. Techn., 1599, December 1966.

Pulse-testing has several advantages that make it more convenient and practical for field use than prior art interference tests. Valid tests are more certain because the use of a series of flow disturbances gives rise to a diagnostic pressure response that can more readily be distinguished from unknown trends in reservoir pressure and other "noise." As stated hereinabove, the time required is only a fraction of that for an intereference test because a special, high-sensitivity differential pressure gauge can detect a much smaller pressure change. Variations in properties between individual wells can be delineated because of the relatively small volume of the reservoir disturbed during these short times. Finally, wells other than the pulsing and responding wells do not have to be shut-in or carefully regulated. One prior art method utilizing a pulsing technique is discussed in a U.S. Pat. No. 3,338,095 to Johnson et al., exemplary of the patents in this area.

Interpretation of well pressure buildup data utilizing conventional methods is sometimes difficult. For instance, in a highly permeable formation, the well pressure may approach the static pressure within a few hours after the well is shut in. This rapid buildup may obscure the pressure buildup interpretation.

A patent to Johnson et al., No. 3,321,965, discloses using a pulsing technique on a single well for determining reservoir properties near a wellbore. However, stabilized unidirectional flow rate and pressure conditions must be established in the well. The attainment of such stabilized conditions is apt to be time-consuming and susceptible to influence by the operation of adjoining wells.

SUMMARY OF THE INVENTION

It is an object of this invention to provide a method of measuring a reservoir property of a porous earth formation encountered by a well without the necessity of establishing stabilized unidirectional flow-rate and pressure conditions in the well.

It is a further object of this invention to provide a pulse-testing method for sampling a property of a reservoir in locations relatively remote from the pulsating well.

It is a still further object of this invention to provide a pulse-testing method for measuring the reservoir property of a porous earth formation where rapid buildup of well pressure precludes a satisfactory interpretation of well pressure buildup data.

The objects are carried out by establishing a pulsating flow of fluid through a well adjacent to a porous earth formation into and out of the formation at rates that vary with time in accordance with a predetermined periodic function. The variations with time of the pressure in the well is measured and the phase shift and amplitude of the pressure variations with time relative to the variations with time of the rates of the pulsating flow of fluid is determined.

DESCRIPTION OF THE PREFERRED EMBODIMENT

Figure 1:
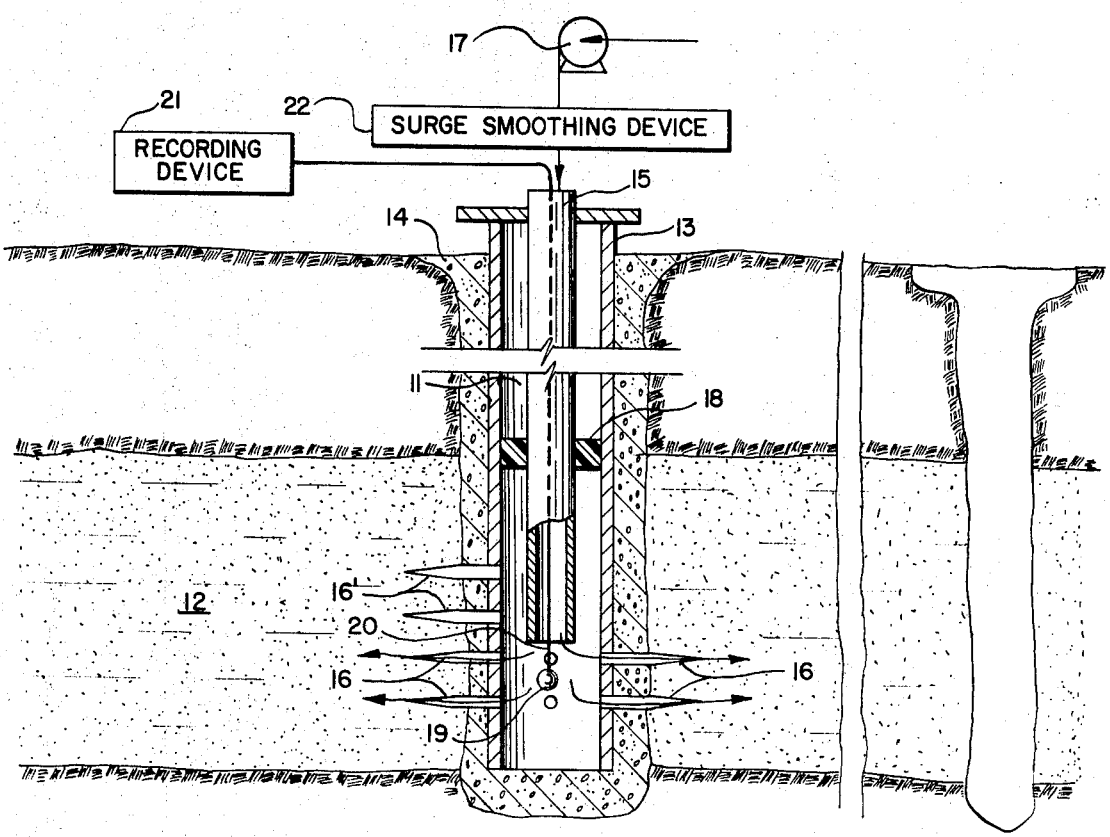
FIG. 1 is a vertical sectional view, partly schematic, of a preferred embodiment of the invention.

Referring to the drawing, FIG. 1 shows a well borehole 11 extending into a subterranean porous earth formation 12. Well borehole 11 includes a casing 13 cemented at 14, as is well known in the art. A tubing string 15 disposed in well borehole 11 with the lower end thereof in communication with formation 12. Tubing string 15 is packed in well borehole 11 by packers 18, as is well known in the art. A plurality of perforations 16 extend through cemented casing 13 into formation 12 for introducing fluids from tubing string 15 into formation 12. Perforations 16 are formed by any of the various means well known in the art, such as jet or bullet perforating, charged projectiles, etc. Pumping means 17 is in communication with both an external fluid source (not shown) and tubing string 15 for pumping fluids at a pulsating rate into tubing string 15 for reasons to be discussed further hereinbelow. In addition to the lowermost perforations 16, a plurality of upper perforations 16' extend through casing 14, as illustrated in FIG. 1. Perforations 16' are preferably disposed on only one side of casing 14 and communicate with a downhole pressure measuring device 19 disposed below packer 18 and coupled, through suitable cable means 20, to a pressure recording device 21.

In order to control the flow of fluids into and out of well borehole 11, a conventional surge-smoothing device 22 is preferably disposed between pumping means 17 and tubing string 15.

In operation, a fluid, such as oil, is pumped into well borehole 11 through tubing string 15. The fluid flows from tubing string 15 into the earth formation 12 through perforations 16 as indicated by the arrows in FIG. 1. The rate of flow of the fluid is regulated by gradually opening and then throttling pumping means 17. This rate of flow may be controlled automatically by means of the surge-smoothing device 22.

A pulsating flow of fluid is preferably established through well borehole 11 into earth formation 12 at rates that vary with time in accordance with a harmonic and periodic function.

As illustrated in FIG. 1, the flow of fluid out formation 12 and through perforations 16' is measured by means of recording device 19 and recorded on recording device 21. In this manner, a harmonic and periodic variation of fluid flow is accomplished by gradually opening and then throttling means arranged to pump fluids into well borehole 11, gradually opening and then throttling the downhill-pressure-induced flow of fluid out of well borehole 11, and repeating the cycle. This may be effected, by way of example, by utilizing a combination of conventional pumping and surge-smoothing devices with conventional automatic flow-direction and throttling devices.

During these operations, the variations with time of the pressure in well borehole 11 is measured and the phase shift and amplitude of the pressure variations with time relative to the variations with time of the pulsating flow of fluid is determined.

Figure 2:
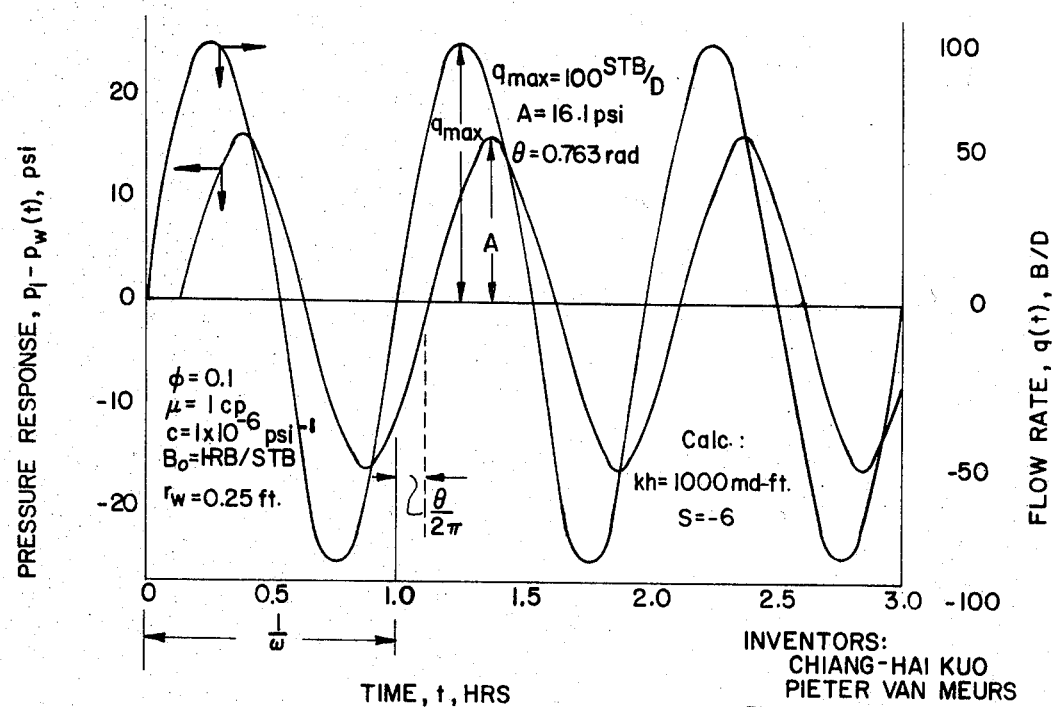
FIG. 2 is a graphical illustration of the embodiment of FIG. 1.

Referring now to FIG. 2, the flow wave represented by a sinusoidal function being generated at pulsating well borehole 11 is illustrated. The flow rate at the face of the well borehole 11 is represented by $q$, the initial formation pressure by $p_i$ and the well pressure by $p_w$. In accordance with the teachings of this invention, well borehole 11 serves as both a pulsating well and a responding well, and the pressure responds and rate are measured simultaneously. The permeability-thickness product ($kh$-value) of the formation 12 and the permeability damage or improvement near well borehole 11 (i.e., the skin factor) may be calculated by measuring the phase shift and the amplitude of the pressure responses.

Assuming for the purposes of discussion that porous earth formation 11 is a homogeneous semi-infinite reservoir containing a single fluids of constant compressibility, the solution to the continuity equation for radial flow of a single fluid of constant compressibility may be derived as follows:

$$P(r_D, t_D) = \frac{\mu}{2\pi kh} \int_0^{t_D} f(r_D, \lambda) q(t_D - \lambda) d\lambda \quad (1)$$

where $$f(r_D, t_D) = L^{-1}\{F(r_D, s) = \frac{K_0(r_D\sqrt{s})}{\sqrt{s}K_1(\sqrt{s})}, \text{ and } P(r_D, t_D)$$

$$= p_i - p(r_D, t_D)$$

Two indepedent dimensionless variables are $r_D = r/r_w$ and $t_D = kt/\phi\mu c r_w^2$ and:

P = pressure change ($P = p_i - p$);
$p_i$ = initial formation pressure;
$p$ = pressure as a function of radial distance and time;
$\mu$ = viscosity;
$k$ = permeability;
$h$ = formation thickness;
$F(r_D, s)$ = Laplace transform of $f(r_D, t_D)$;
$r$ = radial distance;
$r_w$ = well radius;
$t$ = time;
$\phi$ = porosity; and
$c$ = compressibility of fluid.

When $q(t_D)$ is represented by a sinusoidal function with a maximum amplitude $q_{max}$, $$q(t_D) = R\{q_{max} e^{i\omega_D t_D}\} \quad (2)$$

Then Equation 1 is rewritten as:

$$P(r_D, t_D) = R\left\{\frac{\mu q_{max} e^{i\omega_D t_D}}{2\pi kh}\left[F(r_D, i\omega_D) - \int_{t_D}^{\infty} f(r_D, \lambda) e^{-i\omega_D \lambda} d\lambda\right]\right\} \quad (3)$$

where the dimensionless frequency $\omega_D$ is related to the actual frequency $\omega$ by the following relationship:

$$\omega = \frac{k\omega_D}{2\pi\phi\mu c r_w^2} \quad (4)$$

The second term on the right-hand side of Equation 3 represents the transient oscillation. After a short period for damping of the transient, only the forced oscillations will remain (see Solodovnikov, V. V. (1960), Introduction to the Statical Dynamics of Automatic Control Systems, Dover Publications, Inc., New York, N.Y., for a discussion on this point). The pressure change at the well face is obtained from Equation 3 as $$P(1, t_D) = R\left\{\frac{\mu q_{max} e^{i\omega_D t_D}}{2\pi kh} F(1, i\omega_D)\right\} \quad (5)$$

The pressure head due to the well damage (i.e., the pressure drop $\Delta p_s$) is given by $$\Delta p_s = R\left\{S \frac{\mu q_{max} e^{i\omega_D t_D}}{2\pi kh}\right\} \quad (6)$$

as discussed by Matthews, C. S. and Russell, D. G. (1967), "Pressure Build Up and Flow Tests in Wells," Monograph, vol. 1, SPE of AIME. Thus, the total pressure difference at the well face due to flow and skin effects is obtained by summing up Equations 5 and 6.

$$p_i - p_w(t_D) = R\left\{\frac{\mu q_{max}}{2\pi kh}[F(1, i\omega_D) + S]e^{i\omega_D t_D}\right\} \quad (7)$$

For cases of practical interest, $\omega_D$ is small (i.e., less than 0.1), and $F(1, i\omega_D)$ can be approximated by a log-function. Thus, Equation 7 is further simplified to:

$$p_i - p_w(t_D) = R\left\{\frac{\mu q_{max}}{2\pi kh}\left[0.116 - \frac{1}{2}1, i\omega_D + S - i\frac{\pi}{4}\right]e^{i\omega_D t_D}\right\} \quad (8)$$

Therefore, the maximum amplitude of the pressure response (A) is equal to:

$$A = \frac{\mu q_{max}}{2\pi kh}\left[\left(0.116 - \frac{1}{2}\ln\omega_D + S\right)^2 + \frac{\pi^2}{16}\right]^{1/2} \quad (9)$$

The phase shift ($\theta$) between the flow and the pressure responses is:

$$\theta = \tan^{-1} \frac{\pi}{4\left(0.116 - \frac{1}{2}\ln\omega_D + S\right)} \quad (10)$$

by rearranging Equations 9 and 10, the following relationships are obtained:

$$kh = \frac{\mu q_{max}}{8A} \left|\csc\theta\right|; \quad (11)$$

and $$S = \frac{\pi}{4} \cot\theta + \frac{1}{2}\ln\omega_D - 0.116 \quad (12)$$

These equations imply that the $kh$-value (permeability-thickness product) and S (permeability damage or improvement near the well borehole) may be calculated by measuring the phase shift ($\theta$) and the amplitude of the pressure response (A) as graphically depicted in FIG. 2.

In summary, it can be seen from the foregoing that an invention is described which enables one to measure the permeability thickness product ($kh$) of a reservoir and the permeability damage or improvement near a well borehole (skin factor) without the need for measuring a pressure buildup curve of stabilizing injection or production rates. A flow wave represented by a sinusoidal function is generated in a well borehole.

By using relatively long-duration, high-amplitude flow phases, the pressure-response measurements may be made in a well borehole adjoining the pulsating well borehole in order to measure the transmissibility and the storage capacity of the porous earth formation in locations relatively remote from the pulsating well borehole. Thus, the method of this invention may be utilized for making interface-tracing measurements of the type described in a patent to Johnson et al., U.S. No. 3,338,095.

We claim as our invention:

1. A method for measuring a reservoir property of a porous earth formation adjacent to a well which comprises the steps of:
   establishing a pulsating flow of fluid through the well into and out of the earth formation at rates that vary with time in accordance with a predetermined periodic function;
   measuring the variations with time of the pressure in the well; and
   determining the phase shift and amplitude of the pressure variations with time relative to the variations with time of the rates of the pulsating flow of fluid.

2. The method of claim 1 wherein the step of establishing a pulsating flow of fluid includes the step of establishing a fluid rate that varies in time in accordance with a predetermined sinusoidal function of a maximum rate amplitude equal to $q_{max}$.

3. The method of claim 2 wherein the maximum amplitude of the pressure responses is equal to:

$$A = \frac{\mu q_{max}}{2\pi kh}\left[\left(0.116 - \frac{1}{2}\ln\omega_D + S\right)^2 + \frac{\pi^2}{16}\right]^{1/2}$$

where $\mu$ = viscosity of the porous earth formation fluid;
$q_{max}$ = maximum amplitude of the flow wave;
$k$ = permeability;
$h$ = formation thickness;
$\omega_D$ = dimensionless frequency; and
$S$ = skin factor.

4. The method of claim 2 wherein the phase shift between the pulsating flow of fluid and the pressure responses ($\theta$) is equal to:

$$\theta = \tan^{-1} \frac{\pi}{4\left(0.116 - \frac{1}{2}\ln\omega_D + S\right)}$$

5. The method of claim 2 wherein the permeability-thickness product ($kh$) of the porous earth formation is equal to:

$$kh = \frac{\mu q_{max}}{8A}\left|\csc\theta\right|$$

where:

$\mu$ = viscosity of the porous earth formation fluids;
$q_{max}$ = maximum amplitude of the flow wave;
$A$ = maximum amplitude of the pressure response; and
$\theta$ = phase shift between the pulsating flow of fluid and the pressure responses.

6. The method of claim 2 wherein the skin factor (S) is equal to:

$$S = \frac{\pi}{4}\cot\theta + \frac{1}{2}\ln\omega_D - 0.116$$

where:

$\omega_D$ = dimensionless frequency.

7. The method of claim 1 including, in a well adjacent to the well in which a pulsating flow of fluid is established, carrying out the steps of:
   establishing a pulsating flow of fluid through said well adjacent to the first-mentioned well into and out of the porous earth formation at rates that vary with time in accordance with a predetermined periodic function while flowing the fluid through the first-mentioned well for a relatively long duration at a relatively high amplitude;
   measuring the variations with time of the pressure in the second-mentioned well;
   determining the phase shift and amplitude of the pressure variations with time relative to the variations with time of the rates of the pulsating flow of fluid in the second-mentioned well; and
   comparing the differences between the phase shift and amplitude of the two mentioned wells.

References Cited

UNITED STATES PATENTS 3,338,095   8/1967   Johnson et al. _____ 73—155

JERRY W. MYRACLE, Primary Examiner